US012343908B2

(12) United States Patent
Richter et al.

(10) Patent No.: US 12,343,908 B2
(45) Date of Patent: Jul. 1, 2025

(54) PROCESS FOR PRODUCING POLYMETHYL METHACRYLATE RIGID FOAMS AS CORE MATERIALS IN ROTOR BLADES OF WIND POWER PLANTS AND IN BOATBUILDING

(71) Applicant: Evonik Operations GmbH, Essen (DE)

(72) Inventors: Thomas Richter, Darmstadt (DE); Christoph Seipel, Babenhausen (DE); Vincent Ma Junyong, Darmstadt (DE); Florian Becker, Darmstadt (DE); Lisa Langel, Mannheim (DE)

(73) Assignee: Evonik Operations GmbH, Essen (DE)

( * ) Notice: Subject to any disclaimer, the term of this patent is extended or adjusted under 35 U.S.C. 154(b) by 400 days.

(21) Appl. No.: 17/632,961

(22) PCT Filed: Jun. 24, 2020

(86) PCT No.: PCT/EP2020/067571
§ 371 (c)(1),
(2) Date: Feb. 4, 2022

(87) PCT Pub. No.: WO2021/023432
PCT Pub. Date: Feb. 11, 2021

(65) Prior Publication Data
US 2022/0339829 A1   Oct. 27, 2022

(30) Foreign Application Priority Data

Aug. 8, 2019   (EP) .................................... 19190719

(51) Int. Cl.
| | |
|---|---|
| B29C 44/12 | (2006.01) |
| B29C 35/08 | (2006.01) |
| B29C 44/02 | (2006.01) |
| B29C 44/06 | (2006.01) |
| B29C 44/34 | (2006.01) |
| B29K 33/00 | (2006.01) |
| B29L 31/08 | (2006.01) |

(52) U.S. Cl.
CPC .......... *B29C 44/12* (2013.01); *B29C 35/0805* (2013.01); *B29C 44/02* (2013.01); *B29C 44/06* (2013.01); *B29C 44/3415* (2013.01); *B29K 2033/12* (2013.01); *B29K 2995/0063* (2013.01); *B29L 2031/085* (2013.01); *B29L 2031/087* (2013.01); *Y02E 10/72* (2013.01)

(58) Field of Classification Search
CPC ..... B29C 44/12; B29C 44/3415; B29C 44/06; B29C 44/02; B29C 35/02; B29C 35/0805; B29C 44/58; B29C 70/06; B29C 2035/0822; B29K 2033/12; B29K 2995/0063; B29K 2105/0872; B29K 2715/003; B29L 2031/085; B29L 2031/3067; B29L 2031/087; B29L 2031/08; Y02E 10/72; Y02E 10/70–74
See application file for complete search history.

(56) References Cited

U.S. PATENT DOCUMENTS

| | | | | |
|---|---|---|---|---|
| 6,316,091 | B1 * | 11/2001 | Richart | A61L 27/12 |
| | | | | 264/43 |
| 10,584,225 | B2 | 3/2020 | Richter et al. | |
| 10,954,319 | B2 | 3/2021 | Richter et al. | |
| 11,155,662 | B2 | 10/2021 | Richter et al. | |
| 2009/0211173 | A1 * | 8/2009 | Willey | B29C 70/222 |
| | | | | 156/173 |
| 2014/0134422 | A1 * | 5/2014 | Kraatz | B32B 25/10 |
| | | | | 264/46.4 |
| 2015/0158237 | A1 * | 6/2015 | Frank | C08L 27/16 |
| | | | | 528/196 |
| 2017/0002236 | A1 | 1/2017 | Papenbroock et al. | |
| 2017/0145990 | A1 * | 5/2017 | Drack | F03D 1/0641 |
| 2017/0210104 | A1 * | 7/2017 | Doo | B32B 27/08 |
| 2017/0306922 | A1 * | 10/2017 | Nakamura | C08K 3/04 |
| 2017/0334155 | A1 * | 11/2017 | Buehler | B29D 99/0003 |
| 2018/0066078 | A1 | 3/2018 | Richter et al. | |
| 2018/0079882 | A1 * | 3/2018 | Richter | C08K 3/36 |
| 2018/0215063 | A1 * | 8/2018 | Richter | B26D 1/54 |
| 2019/0211124 | A1 | 7/2019 | Richter et al. | |
| 2020/0385564 | A1 * | 12/2020 | Wang | B29C 70/28 |
| 2021/0395510 | A1 * | 12/2021 | Shin | C08L 35/06 |
| 2022/0339829 | A1 * | 10/2022 | Richter | B29C 44/12 |

FOREIGN PATENT DOCUMENTS

| | | |
|---|---|---|
| CN | 103302861 | 9/2013 |
| CN | 106170508 | 11/2016 |
| CN | 106661305 | 5/2017 |
| CN | 106795864 | 5/2017 |
| DE | 102010038716 | 2/2002 |
| EP | 3075770 | 10/2016 |
| EP | 3 277 748 | 2/2018 |
| KR | 101928236 | 12/2018 |

(Continued)

OTHER PUBLICATIONS

European Search Report issued Feb. 25, 2020 in European Application No. 19190719.5, 10 pages.
International Search Report issued Oct. 26, 2020 in PCT/EP2020/067571, with English translation, 7 pages.
Poly(methyl methacrylate)—Wikipedia, "Poly(methyl methacrylate)", Aug. 1, 2019, pp. 1-15.
Written Opinion issued Oct. 26, 2020 in PCT/EP2020/067571, with English translation, 12 pages.
U.S. Appl. No. 17/423,152, filed Jul. 15, 2021, Richter et al.
U.S. Appl. No. 17/310,059, filed Jul. 14, 2021, Richter et al.

(Continued)

*Primary Examiner* — Jeffrey M Wollschlager

(74) *Attorney, Agent, or Firm* — Grüneberg and Myers PLLC

(57) ABSTRACT

PMMA-based rigid foams can be used as the core material of sandwich components in rotor blades of wind power plants and in boatbuilding.

15 Claims, No Drawings

(56) References Cited

FOREIGN PATENT DOCUMENTS

WO  2016/156172  10/2016
WO  2021/023444  2/2021

OTHER PUBLICATIONS

Manas Chanda, "Introduction to Polymer Science and Chemistry", *CRC Press*, 2$^{nd}$ edition, 2013, 5 pages.
Russian Office Action dated Feb. 21, 2024, in Russian Patent Application No. 2022105558, with partial English translation, 16 pages.
Wayback Internet Archive Machine, Sep. 22, 2010, 3 pages. URL: https://ru.wikipedia.org/wiki/%D0%A2%D0%B5%D0%BC%D0%BF%D0%B5%D1%80%D0%B0%D1%82%D1%83%D1%80%D0%B0_%D1%81%D1%82%D0%B5%D0%BA%D0%BB%D0%BE%D0%B2%D0%B0%D0%BD%D0%B8%D1%8F.
Wayback Internet Archive Machine, Aug. 8, 2015, 3 pages. URL:https://mplast.by/encyklopedia/temperatura-steklovaniya-polimerov/.

\* cited by examiner

PROCESS FOR PRODUCING POLYMETHYL METHACRYLATE RIGID FOAMS AS CORE MATERIALS IN ROTOR BLADES OF WIND POWER PLANTS AND IN BOATBUILDING

CROSS-REFERENCE TO RELATED APPLICATIONS

This application is the National Stage entry under § 371 of International Application No. PCT/EP2020/067571, filed on Jun. 24, 2020, and which claims the benefit of priority to European Application No. 19190719.5, filed on Aug. 8, 2019. The content of each of these applications is hereby incorporated by reference in its entirety.

BACKGROUND OF THE INVENTION

Field of the Invention

The invention relates to a process for producing polymethyl methacrylate-based rigid foams in sandwich components for use in wind power plants and boatbuilding having a glass transition temperature Tg above 110° C. determined by DMTA measurement according to the standard ISO 6721-7, characterized in that the blowing agent-laden polymer composition is foamed to afford a foam material having an average pore size in the range from 50 to 300 µm measured according to ASTM D3576.

Description of Related Art

Sandwich composites consist of a core material and outer layers applied thereto. These sandwich composites are generally characterized in that they exhibit a high component stiffness coupled with low weight. The core material must meet various requirements, for example it must be securely joined to the outer layers in order to be able to transfer compressive forces. The core material should further have the lowest density possible.

Rigid foams are often utilized as core materials on account of their low density.

To produce the sandwich composites, an outer layer is typically applied to the core material and impregnated with resin or resin-impregnated, but not yet cured fabric materials are applied (prepreg). In a second step the resin in the outer layers is then cured, this also effecting bonding to the core material. Curing takes place at elevated temperatures and pressures to ensure that the outer layers are free from defects and to ensure good bonding of the outer layer to the core material. The resin in the outer layers is joined to the core material through various mechanisms. There may be adhesion/cohesion or chemical bonding of the resin to the outer layers. The resin, which still has a certain flowability before curing, can further also flow into superficially open cells of the foam core and thus also result in positive-connection joining of the outer layer and the core material ("meshing") after curing.

The higher the temperatures and pressures used during the curing of the outer layers, the faster the curing can generally be carried out.

The sandwich composites described hereinabove find widespread use in the construction of blades of wind power plants and in boatbuilding. The employed core materials in these sectors are predominantly rigid foams on account of their low density. PVC- and PET-based foams in particular are used for these applications. Examples thereof are AirexC70.55 (PVC), AirexT10.100 (PET) from 3A Composites, GPET115 (PET) from GURIT, Divinicell H from DIAB or ArmaFORM (PET) from Armacell.

It is important here that certain compressive strengths and heat distortion temperatures be attained to allow manufacture of the components. Since mechanical strengths decrease with density for foams made of the same base polymer, only densities down to a certain lower limit may be used according to the base polymer of the foams. For PET-based foams this lower limit is about twice that of PVC-based foams. PVC-based foams therefore have clear advantages over PET foams. By contrast, PET foams have advantages over PVC foams in terms of the costs of the core materials.

A further factor for the final component weight of the sandwich composite is the resin absorption of the foams. Resin absorption is understood as meaning the inflowing of the still-liquid resin of the outer layers before curing into the superficially open pores. This resin absorption is necessary to ensure positive-connection joining and thus good adhesion of the outer layers to the core material. It is advantageous that only the minimum amount of resin necessary for good bonding is absorbed by the uppermost open pores of the foam since the resin otherwise contributes unnecessarily to the total weight of the final components due to its high density.

SUMMARY OF THE INVENTION

Problem

As described above, the standard core materials used in rotor blades of wind power plants and in boatbuilding are rigid foams based on PVC and PET. However, some of these rigid foams have clear disadvantages.

One disadvantage of both foams is the high resin absorption. This has the result that an unnecessarily large amount of resin is absorbed by the foam which on the one hand results in unnecessarily high costs of the employed resin and on the other hand drives up the final component weight.

A further disadvantage of PET and PVC foams for these applications is that the possible processing temperatures in the production process of the sandwich composites are limited to about 80° C., since above these temperatures the mechanical properties of the PET and PVC rigid foams drop markedly and no longer allow a high-quality manufacturing process (deformation of the core material).

The problem addressed by the present invention was accordingly that of finding a core material for the abovementioned applications which a) has a relatively low resin absorption to save costs and weight and b) simultaneously also allows relatively high process temperatures.

Solution

The problem is now been solved by providing a process for producing polymethyl methacrylate-based rigid foams in sandwich components for use in wind power plants and boatbuilding having a glass transition temperature Tg above 110° C. determined by DMTA (dynamic mechanical thermal analysis) measurement according to the standard ISO 6721-7 (issue date 2005-08), characterized in that the blowing agent-laden polymer composition is foamed to afford a foam material having an average pore size in the range from 50 to 300 µm measured according to ASTM D3576 (issue date 2015).

It has now been found that rigid foams based on polymethyl methacrylate (PMMA) meet the abovementioned requirements of low resin absorption and relatively high process temperatures compared to the rival systems of PET and PVC foams. What is particularly surprising here is that the outer layer bonding was very good despite a markedly lower resin absorption for PMMA foams.

DETAILED DESCRIPTION OF THE INVENTION

A low resin absorption of less than 0.03 g/cm$^2$, measured according to VARI (Vacuum Assisted Resin Infusion), distinguishes the rigid foam according to the invention from the rival systems based on PET and PVC.

The present invention provides PMMA-based foams having an overall pore size in the range from 50-300 μm and a density of the foam of 30-500 kg/m$^3$, preferably less than 250 kg/m$^3$, according to DIN EN ISO 1183 (Issue date 2013-04).

EP 3277748 for example describes a suitable process for producing PMMA foams, which comprises producing the foams by a polymerization, such as by a slab polymerization for example, of monomer mixtures containing predominantly MMA and/or of a syrup consisting of a polymer consisting wholly or predominantly of MMA and a monomer mixture composed wholly or predominantly of MMA, in the presence of a nucleating agent and of a blowing agent that is non-gaseous under polymerization conditions. The fully polymerized PMMA slab thus obtained, which is laden with blowing agent, is then foamed up in a second step by heating, while small and uniform cells are formed by the admixed nucleating agent.

This process is particularly characterized in that the nucleating agent comprises silicon oxide particles having a diameter between 4 and 1000 nm. The composition in question contains from 0.01 to 2.0 wt %, preferably from 0.2 to 1.5 wt % of one or more initiators, from 2 to 20 wt %, preferably from 3 to 15 wt % of one or more blowing agents, from 0.2 to 10 wt %, preferably from 0.5 to 8 wt % of the silicon oxide particles with the diameter between 4 and 1000 nm, preferably between 5 and 500 nm, and from 70 to 97.79 wt %, preferably from 75 to 97.8 wt % of a polymer-forming mixture, wherein said polymer-forming mixture consists of methyl methacrylate (MMA) and/or MMA repeat units to an extent of not less than 75 mol % and may be present as polymer and/or oligomer to an extent of from 0 to 80 wt %, preferably to an extent of from 0 to 50 wt %. This composition is initially polymerized at a temperature between 20° C. and 100° C., preferably between 30° C. and 70° C., and subsequently foamed at a temperature between 130° C. and 250° C., preferably between 150° C. and 230° C. In addition to the recited components, the composition may contain up to 27.79% by weight of further components. Examples of these further components are in particular further polymer components distinct from MMA-containing polymers, UV stabilizers, fillers and pigments.

The silicon oxide particles are preferably $SiO_2$ particles. However, it is also possible that the stoichiometry of these particles is not precisely 1:2. Very small particles in particular may differ from said stoichiometry by up to 30%. It is also possible for up to 20% of the silicon to be replaced by other ions of a metal, such as of aluminium for example. The only important requirement for the purposes of the present invention is that the stoichiometric ratio of silicon to oxygen be between 0.7 and 1.3:2, and that silicon comprise not less than 80 mol % of non-oxygen atoms in the particle. However it is also possible to use other nucleating agents such as talcum, phyllosilicates, graphenes, graphite oxide, $Al_2O_3$, polymer particles which are immiscible, or insoluble in the monomer mixture, and the like. When the pore size is in the described range even without nucleating agent, the nucleating agent may be omitted.

The polymer-forming mixture in addition to MMA may include up to 25 wt % of further components. These further components may comprise MMA-copolymerizable monomers, chain-transfer agents and/or crosslinkers. The MMA and the copolymerizable monomers may be employed entirely in the form of monomers. The polymer-forming composition may contain in particular up to 0.5 wt % of crosslinker and/or up to 1.5 wt % of chain-transfer agent.

In a more conveniently handleable embodiment of the invention, however, it is also possible for up to 80% by weight, preferably not more than 50% by weight, of the MMA and the copolymerizable monomers to be present in the form of polymer and/or oligomer. The advantage of such a syrup, consisting of monomers and polymers/oligomers, is that it has a higher viscosity than a pure monomer mixture and accordingly the total amount of energy liberated in the polymerization is lower.

The MMA-copolymerizable monomers may be in particular acrylates, such as, in particular, methyl acrylate, ethyl acrylate, propyl acrylate or n-butyl acrylate. The copolymerization of acrylates serves to additionally stabilize the foam at high foaming temperatures in particular, since these foaming temperatures may be above the ceiling temperature of the pure MMA. When no stabilizing comonomers are incorporated, a shorter foaming time or a correspondingly lower foaming temperature is preferable.

Further examples of suitable comonomers are (meth) acrylic acid, methacrylates, such as ethyl methacrylate, propyl methacrylate, n-butyl methacrylate, tert-butyl (meth) acrylate, isopropyl (meth)acrylate, isobutyl (meth)acrylate, styrene, (meth)acrylamide, an N-alkyl(meth)acrylamide having 1 to 12 carbon atoms in the alkyl group, a hydroxyalkyl (meth)acrylate having 1 to 4 carbon atoms in the alkyl group, a polyether (meth)acrylate where the polyether may have a molecular weight between 200 and 5000. These comonomers may also take the form of a mixture of two or more thereof. When these comonomers comprise n-butyl (meth)acrylate and/or n-propyl (meth)acrylate, the proportion of the overall composition attributable to them may not exceed a combined 3 wt %. When crosslinkers are employed these are preferably a di-, tri- or tetra(meth)acrylate, allyl (meth)acrylate, triallyl cyanurate, triallyl isocyanurate or a mixture containing at least two of these crosslinkers.

The notation (meth)acrylate here means methacrylate, for example methyl methacrylate, ethyl methacrylate, etc., as well as acrylate, for example methyl acrylate, ethyl acrylate, etc, and mixtures of both.

When chain-transfer agents are employed these are preferably a compound having one to five mercaptan groups, a γ-terpinene or a mixture of at least two of these chain-transfer agents. The chain-transfer agent is particularly preferably pentaerythritol tetrathioglycolate, 2-mercaptoethanol, an alkyl mercaptan having 2 to 12 carbon atoms, thioglycolic acid, a thioglycolate, γ-terpinene or a mixture of at least two of these chain-transfer agents.

A particularly important aspect of the present invention is that of using the nucleating agents in the composition to be foamed. This use of nucleating agents in the manufacture of PMMA foams is novel over the prior art and has the surprising effect that the PMMA foams are obtained with particularly small and uniform and also uniformly distributed cells. The fine cellularity thus obtained is of great importance for various applications. In insulating applications the insulating effect of a foam generally increases with decreasing cell size for the same density and cell gas. In lightweight construction applications where a foam core is faced with resin-impregnated outer layers, resin absorption by the foam core should be minimal to save weight. The finer the cells of the closed-cell foam used therefor, the less resin can be absorbed.

It was found that, surprisingly, a distinctly more fine-cell foam is obtainable with use of silicon oxide particles as compared with a foam based on a base recipe without nucleating agent. AEROSIL OX50 (from EVONIK Industries AG) provides a very finely cellular foam for instance. It was further found that, surprisingly, no such effect was obtained with other potentially nucleating additives such as, for example, talcum powder. On the contrary, talcum tends to interfere with the foaming process, any foam obtained being highly inhomogeneous. The use of $Al_2O_3$ particles (AEROXIDE ALU C from EVONIK Industries AG) likewise did not yield any success, since foaming was impossible here. This shows that merely the incorporation of just any particles in the PMMA foam production process shown herein does not bring about the desired degree of cellular refinement, but that instead, surprisingly, initially only silicon oxide particles appear to be suitable therefor.

The PMMA foams produced according to the invention further have a surprisingly high strength coupled with a surprisingly low brittleness and may therefore find use in lightweight construction for example. The good material properties further make it possible to eschew the use of plasticizers, for example relatively long-chain alkyl (meth) acrylates or phthalates, which according to present knowledge have a positive effect on flowability/foamability but at the same time have a negative effect on the mechanical properties, in particular the strength, of the PMMA foam.

Especially suitable blowing agents are tert-butanol, n-heptane, MTBE, methyl ethyl ketone, an alcohol having from one to four carbon atoms, water, methylal, urea, isopropyl (meth)acrylate and/or tert-butyl (meth)acrylate. When isopropyl (meth)acrylate and/or tert-butyl (meth)acrylate are used they are at the same time a constituent of the recited monomer composition and are initially entirely or partially polymerized into the polymers formed during the polymerization. (Meth)acrylic acid repeat units are subsequently formed in the polymer in the foaming by elimination of propene and isobutene. In a particular embodiment polymers produced from large proportions of these monomers or entirely from these monomers may also be used. The use of such polymerizable and/or polymerized comonomers that release blowing agents makes it possible, for example, to obtain particularly small and regular cells.

Particularly suitable blowing agents are tert-butyl (meth) acrylate, isopropyl (meth)acrylate, tert-butanol, isopropanol, tert-butyl methyl ether and poly(tert-butyl (meth)acrylate).

The polymerization is preferably carried out in a shape-conferring vessel, in particular in the form of a chamber polymerization between two sheets, for example glass sheets. In the simplest case a rectangular tub may be concerned for example. Polymerization in such a tub later affords a sheet whose thickness has been determined by the fill level in the tub/the sheet spacing. However, more complex shapes are furthermore also conceivable for the vessel. The polymerization is preferably carried out at a temperature in the range from 30 to 70° C. Here, generally known free-radical initiators, for example peroxides or azo initiators, in addition to redox systems or UV initiators, can be used as initiators. Polymerization temperatures below 40° C. apply particularly to these redox systems and UV initiators. UV initiators are initiated by irradiation with appropriate UV light, while redox initiators comprise two-component systems initiated by mixing the two components and the monomers.

Foaming may subsequently take place in the same vessel, in which case the volume increase is restricted to one direction, the open side of the vessel. Yet the polymerized material is also foamable without confining enclosure. Foaming is preferably carried out in an oven. As an alternative, it is also possible to bring about foaming by irradiation with IR radiation, in particular radiation having a wavelength in the range from 0.78 to 2.20 μm, preferably from 1.20 to 1.40 μm. Microwave foaming represents a further alternative. The combination of different methods, such as IR radiation, microwaves and/or heating in an oven, is also conceivable.

Both the foaming and the preceding polymerization may each be carried out in a plurality of temperature stages. In the polymerization a later increasing of the temperature can additionally increase conversion and thus reduce residual monomer content. During foaming a staged increasing of the foaming temperature may be used to influence cell distribution, cell size and the number of cells.

The process may optionally also be performed such that the polymerization proceeds only incompletely, in this case preferably to a conversion of at least 80%, and final end-polymerization is effected during the foaming. Such a process has the advantage that at commencement of the foaming procedure the remaining monomers have a plasticizing effect without any plasticizing compound remaining in the finished foam. Thus in such an embodiment the polymerization and the foaming would in part be effected simultaneously at a single foaming temperature.

Apart from the process of the invention, the present invention also provides PMMA foams which can be produced, for example, by such a process. Such a PMMA foam is characterized in that the solid fraction of this foam contains from 72 to 98 wt % of a polymer incorporating not less than 75 mol % of MMA repeat units, and 0.2 to 12.5 wt % of silicon oxide particles. The foam further has a density between 25 and 250 kg/m$^3$, preferably between 40 and 250 kg/m$^3$, measured according to DIN EN ISO 1183, and an average cell size below 500 μm. Overall cell size is preferably below 500 μm.

Cell size is determined in accordance with the ASTM D 3576 standard bar the following departures therefrom: It is first of all not a blade-cut section of the PMMA foam which is viewed, but a broken edge thereof. Further, on account of the relatively small cells, analysis is done not by means of an optical microscope, but via a scanning electron microscope measurement. The calculation of the cell size from the pictures obtained is standard compliant, however.

Preference is given in particular to PMMA foams in which the polymer was formed from MMA, an initiator, one or more crosslinkers selected from di-, tri- or tetra(meth) acrylates, allyl (meth)acrylate, triallyl cyanurate and/or triallyl isocyanurate, and one or more chain-transfer agents.

The PMMA-based foams show a resin absorption of 0.01 to 0.03 g/cm$^2$, preferably of 0.02 g/cm$^2$, compared to typical PET and PVC foams whose foam absorption is in the range 0.03-0.06 g/cm$^2$ measured according to VARI.

Outer layer adhesion is simultaneously excellent. This is surprising since the comparatively small cells and the resulting potentially poorer "meshing" of the foam and the cured resin would not have been expected to result in good outer layer adhesion.

It has further been found that PMMA-based foams have a higher glass transition temperature than PVC and PET foams. The glass transition temperatures for PMMA-based foams determined by DMTA measurement according to the standard ISO 6721-7 is at least 110° C., preferably at least 130° C. This in turn allows higher temperatures during the curing process as a result of which process times can be shortened and thus made more cost-effective. It has been found that the curing of the resin in the production of sandwich components may be performed at temperatures of greater than 110° C., preferably greater than 120° C. This is not possible for conventional foams since decomposition and/or softening already takes place at these temperatures.

The curing of the resin in the production of the sandwich components at temperatures >110° C. is effected by heating of the mould or irradiation.

The curing of the resin may be effected in an electrically heatable mould or with a mould having a fluid (for example steam) passing through it.

The curing of the resin by irradiation is effected through IR radiation or microwave.

It is further possible to produce the sandwich components according to the invention under elevated pressure. Pressing processes or autoclave processes are utilized here. This comprises introducing the fabric ply into the mould, applying the foam core and applying a further fabric layer. Depending on the process variant, pressure bar or a vacuum is applied and the resin is injected/aspirated.

The polymethyl methacrylate-based rigid foams may be employed in sandwich materials upon which particular demands in respect of weight are placed. The reduced resin absorption results in a reduced weight and accordingly the thus-produced sandwich materials are particularly suitable for applications demanding good composite adhesion coupled with low weight. This further results in lower costs in respect of consumption of utilized resins. In addition, the higher heat distortion temperatures of the investigated PMMA foams allow potentially higher process temperatures and thus process time savings.

The polymethyl methacrylate-based rigid foams are suitable as weathering-resistant insulation materials, core material for sandwich composites, in lightweight construction, as packaging material, as energy absorbers in crash elements, in architectural building elements, as a diffuser in lighting applications, in furniture construction, in boatbuilding, in vehicle construction, in the aerospace industry or in model building, in particular as a core material in rotor blades in wind power plants.

EXEMPLARY EMBODIMENTS

Resin Absorption
Materials Used:
PVC foam: Airex C70.55 from 3A Composites, Steinhausen ZG (Switzerland)
PET foam: Airex T10.100 from 3A Composites, Steinhausen ZG (Switzerland)
PMMA foam: ROHACRYL55 from Evonik Resource Efficiency GmbH, Germany The resin absorption of the core materials must be experimentally determined by VARI (vacuum assisted resin infusion). Minimum dimensions for the specimen sheets of 300×300 mm are specified.

Before infusion the specimen dimensions and specimen weights must be adjusted to a measurement accuracy of ±0.01 mm and ±0.01 g to determine specimen density and basis weight. Since the viscosity of the resin is strongly dependent on temperature, the test setup is heated to 30° C. to ensure constant conditions. The airtightness of the test setup was tested by a vacuum test, wherein resin inlets and outlets were clamped off and vacuum loss was checked after 30 min.

In addition, the resin components should be degassed. This is carried out by evacuating the resin and the hardener under vacuum at −0.8 bar and 40° C. for 60 min. Before mixing, both components must be cooled to room temperature in order that the reaction may be commenced in controlled fashion. This was followed by a second deaeration of the resin system at −0.8 bar and 40° C. for 10 min. Infusion can be commenced once the vacuum test of the test setup is complete. The vacuum should be maintained until the resin has solidified. After termination of the infusion, the resin system should cure at 30° C. for at least 18 hours.

Finally, the edges were squared and the peel plies were removed. The difference between the basis weight of the dry foam sheet and the injected foam sheet gives the resin absorption.

The obtained values for resin absorption are summarized in the following table:

| Foam | Resin absorption (g/cm$^2$) |
| --- | --- |
| PMMA foam | 0.0196 |
| PET foam | 0.0591 |
| PVC foam | 0.0370 |

Outer Layer Adhesion

According to the standard drum peel test (DIN 53295), a sandwich sheet having a projection of the outer layer was clamped into the known test setup. With the aid of a gripper, the outer layer was gripped by its projection and peeled from the core material at a constant apparatus speed. The force required therefor is plotted. This provides information about outer layer adhesion.

The tests performed resulted in failure of the foam material. The fact that cohesive failure rather than adhesive failure (separation of foam core and outer layer in the adhesive layer (resin layer)) is observed is indicative of good outer layer adhesion.

This demonstrates sufficient outer layer adhesion to the PMMA foam core.

Outer layer adhesion is also measured in another test method.

The flatwise test (ASTM C297) is performed using 50×50 mm test specimens. The test specimen consists of a foam core, a resin layer and an outer layer on the top surface and the bottom surface. The test specimen is clamped into the tensile apparatus. The upper holder is pulled at a constant tensile test speed.

Pulling was continued until the failure of the foam core in the performed tests. No detachment of the outer layer from the core material at the resin layer was detected.

This demonstrates sufficient outer layer adhesion.

Measurement of Glass Transition Temperature to Estimate Heat Distortion Temperature Tg values were determined via DMTA measurements according to the standard ISO 6721-7. The following values were determined:

| Foam | $T_g$ (° C.) |
|---|---|
| PMMA foam | 145 |
| PET foam | 80 |
| PVC foam | 80 |

Curing at Elevated Temperature

The foam core provided with the outer layers is injected with an epoxy resin. The material is heated to 110° C. in the sealed mould. Crosslinking is accelerated by the elevated temperature.

Relatively short cycle times were determined. In comparative tests performed at room temperature the curing time was more than 24 h. At a temperature of 110° C. the curing process was able to be shortened to 20 min.

The invention claimed is:

1. A process for producing a rotor blade for use in a wind power plant or boatbuilding, the process comprising employing a polymethyl methacrylate-based rigid foam in sandwich components to make the rotor blade
   wherein the polymethyl methacrylate-based rigid foam in sandwich components is made by the process comprising:
   foaming a blowing agent-laden polymer composition to afford a polymethyl methacrylate-based rigid foam having an average pore size in the range from 50 to 300 μm measured according to ASTM D3576 to form a core material for the sandwich components, and
   curing a resin during production of the sandwich components at a temperature greater than 110° C. by heating or irradiating in a mould,
   to form an outer layer around the core material,
   wherein the polymethyl methacrylate-based rigid foam has a glass transition temperature Tg above 110° C. determined by DMTA measurement according to ISO 6721-7 standard,
   wherein a resin absorption of the polymethyl methacrylate-based rigid foam is 0.01 to 0.03 g/cm² measured according to VARI, and
   wherein during production of the sandwich components, the polymethyl methacrylate-based rigid foam is injected with an epoxy resin and the epoxy resin is cured at a temperature of 110° C.

2. The process according to claim 1, wherein the curing of the resin is effected in an electrically heatable mould.

3. The process according to claim 1, wherein the curing of the resin is performed by means of IR radiation.

4. The process according to claim 1, wherein the polymethyl methacrylate-based rigid foam has a density of 30-500 kg/m³ measured according to DIN EN ISO 1183.

5. The process according to claim 1, wherein the rotor blade is for use in a wind power plant.

6. The process according to claim 1, wherein the rotor blade is for use in boatbuilding.

7. The process according to claim 1, wherein the core material consists of the polymethyl methacrylate-based rigid foam.

8. The process according to claim 1, wherein the foam consists of the polymethyl methacrylate-based rigid foam.

9. The process according to claim 1, wherein the blowing agent-laden polymer composition comprises a nucleating agent.

10. The process according to claim 9, wherein the nucleating agent comprises silicon oxide particles.

11. The process according to claim 1, wherein the blowing agent-laden polymer composition comprises 0.01 to 2.0 wt % of one or more initiators, from 2 to 20 wt % of one or more blowing agents, and from 0.2 to 10 wt % silicone oxide particles with a diameter between 4 and 1000 nm, and from 70 to 97.9 wt % of a polymer forming mixture, wherein the polymer forming mixture consists of methyl methacrylate repeat units and/or methyl methacrylate repeat units to an extent of not less than 75 mol %.

12. The process according to claim 1, wherein the foaming is at a temperature between 130 and 250 degrees C.

13. The process according to claim 1, wherein the resin absorption of the polymethyl methacrylate-based rigid foam is 0.01 to 0,02 g/cm² measured according to VARI.

14. The process according to claim 1, wherein the polymethyl methacrylate-based rigid foam has a glass transition temperature Tg above 130° C. determined by DMTA measurement according to ISO 6721-7 standard.

15. A rotor-blade produced according to the process of claim 1.

* * * * *